United States Patent [19]

Yata et al.

[11] Patent Number: 4,674,836
[45] Date of Patent: Jun. 23, 1987

[54] REAR PROJECTION SCREEN

[75] Inventors: Yukio Yata, Chiba; Shingo Suzuki, Zama, both of Japan

[73] Assignee: Mitsubishi Rayon Co., Ltd., Tokyo, Japan

[21] Appl. No.: 837,412

[22] Filed: Mar. 7, 1986

[30] Foreign Application Priority Data

Mar. 11, 1985 [JP] Japan .................................. 60-47936

[51] Int. Cl.⁴ ............................................ G03B 21/60
[52] U.S. Cl. .................................................. 350/128
[58] Field of Search ............................... 350/127–129, 350/167; 353/81

[56] References Cited

U.S. PATENT DOCUMENTS 3,236,150 2/1966 Miller ............................... 350/129 X
3,463,569 8/1969 Bratkowski ......................... 350/129
4,418,986 12/1983 Yata et al. ........................ 350/129 X
4,439,027 3/1984 Shioda et al. .................... 350/128 X
4,469,402 9/1984 Yata et al. ............................ 350/128
4,482,206 11/1984 Van Breemen ....................... 350/128

Primary Examiner—Richard A. Wintercorn
Attorney, Agent, or Firm—Brumbaugh, Graves, Donohue & Raymond

[57] ABSTRACT

Provided is a rear projection screen onto which light from a projector is introduced at an angle from about 40 to 70 deg. with respect to the rear light incidence surface of the screen. A plurality of elongated prisms are formed on the rear surface of the screen, extending along curved lines, each prism having a reflection surface extending along the associated curved line, thereby the light received by the rear surface is internally reflected by the reflection surface, and transmitted through the light transmitting medium of the screen and is then emerged from the front viewing surface thereof.

19 Claims, 24 Drawing Figures

FIG. 15
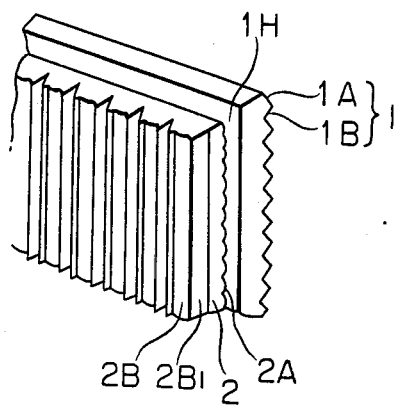
FIG. 16
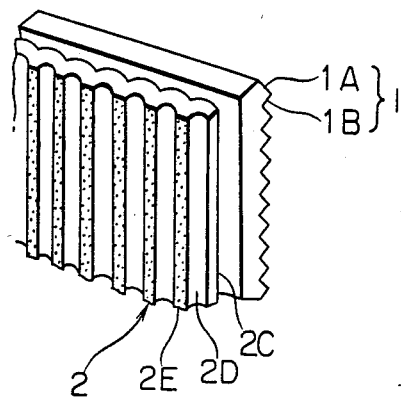
FIG. 17
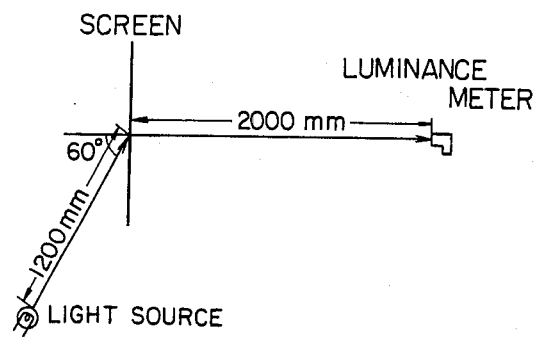
FIG. 18
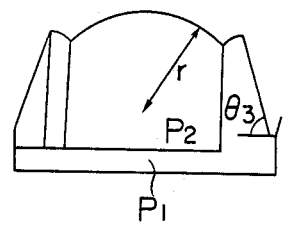
FIG. 19A
| 2.7 | | 2.8 |
|---|---|---|
| | 5.5 | |
| 3.0 | | 2.2 |
FIG. 19B
| 1.2 | | 1.4 |
|---|---|---|
| | 5.5 | |
| 0.4 | | 0.4 |

4,674,836

REAR PROJECTION SCREEN

BACKGROUND OF THE INVENTION

The present invention relates to a rear projection screen for use in a projection television set and the like.

A shown in FIG. 1, a rear projector used in a projection television set is adapted to expand light emerging from a light source (P), e.g. a CRT, by means of a lens system (L), project the light from the rear side of a screen (S), and allow a viewer to observe a picture from the opposite side of the screen (S). However, if the distance from the light source (P) to the screen (S) is prolonged as shown, the projector becomes large in size. In practice, therefore, a method is adopted whereby one to three mirrors (M) are combined, and the light is projected after being reflected on them once. However, there have been drawbacks in that, in the method of FIG. 2(A), the height of the projector becomes large, while, in the methods of FIGS. 2(B) and 2(C), it cannot be said positively that the projectors have been made sufficiently compact in terms of the height and depth.

Many types of screens used for such a projector are provided with a circular Fresnel lens on the incidence side, thereby providing a means for allowing every corner of the screen to be brightly when viewed. However, since lens surfaces (a) are continuously formed via non-lens surfaces (b), as shown in FIG. 3, this circular Fresnel lens has a drawback in that the light incident upon the non-lens surfaces (b) indicated by the oblique lines do not converge, thereby reducing the efficiency of the Fresnel lens and adversely affecting the resolution. To prevent this from occurring, a measure is adopted in some cases to dispose the lens surfaces of the Fresnel lens to receive the light from the flat surface and to combine the Fresnel lens with a lenticular lens. However, such an arrangement of the screen with two lenses has disadvantages since the structure of the screen becomes complicated, the picture fades due to the flare occurring between the two lenses, and the efficiency of utilization of the light declines.

In addition, as a screen apparatus which is capable of reducing the depth of a projector, those which are disclosed in Japanese Patent Unexamined Publication Nos. 57120/1983 and 9649/1984 are known, which propose to introduce the light obliquely with respect to a screen, thereby reducing the depth of a projector system. However, since these apparatuses make use of the refraction of a lens, there has been a limit to enlarging the angle of incidence.

To overcome these drawbacks, a rear projection screen has been proposed for observing an image by introducing light at a sharp angle from the rear, characterized in that a plurality of prisms are provided in parallel with each other on the light incidence surface, each prism having a total reflection surface, so that the incident light is totally reflected on the total reflection surface and is then emerged from the front viewing surface of the screen (Japanese Patent Application No. 29964/1984).

Furthermore, prior to the above-described proposal made by the applicants, a projector having a similar arrangement is known (Japanese Patent Unexamined Publication No. 109481/1982).

Thanks to the above-mentioned method including the arrangements proposed by the applicants, it has become possible to provide a rear projection screen enabling the projector to become compact by reducing the dimensions in depth and height and to be bright without reducing the resolving power. Such methods have shortcomings in that even if it is possible to control the light in one axial direction, e.g. in the vertical direction, it is not possible to simultaneously control the light in the other direction, i.e., the horizontal direction.

As a result of carrying out a study to simultaneously control the light in the vertical and horizontal directions, the present invention proposes a screen having a uniform brightness.

To this end, the present invention provides a screen for viewing an image by introducing light from the rear side thereof at a sharp angle, characterized in that the rear surface of this screen has a plurality of elongated prisms disposed along curved lines, including elliptic and parabolic curved lines, each prism having an internal reflection surface extending along curved line, the internal reflection surface reflecting the light received by the rear surface so that the light is transmitted through the light transmitting medium and is then emerges from the front viewing surface.

It is to be understood that the term "curved lines" referred to in the present invention is applicable to hyperbolic lines in addition to the aforementioned arcuate curved, elliptic, and parabolic lines.

Description of the preferred embodiments of the present invention will be made hereinafter with reference to the accompanying drawings.

BRIEF DESCRIPTION OF THE DRAWINGS

FIGS. 9 to 16 are partially perspective views illustrating various other embodiments according to the present invention FIG. 17 is a diagram explaining a method of meassuring the brightness of a screen in a first form of a first example of the invention;

FIG. 18 is a top plan view illustrating a unit of the lenticular lens of a rear projection type screen used in the examples of the present invention; and FIGS. 19A and 19B are diagrams illustrating the measured results as to the examples of the present invention.

PREFERRED EMBODIMENTS OF THE INVENTION

Figure 1:
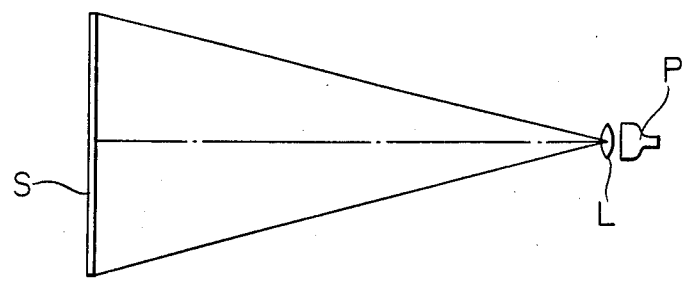
FIGS. 1, 2A, 2B, and 2C are schematic side elevational views explaining a passage of light introduced from a projector to a conventional rear projection screen.
Figure 2A:
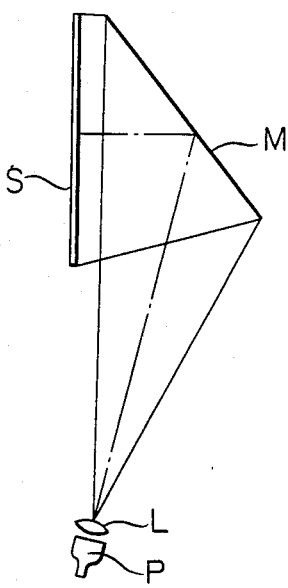
Figure 2B:
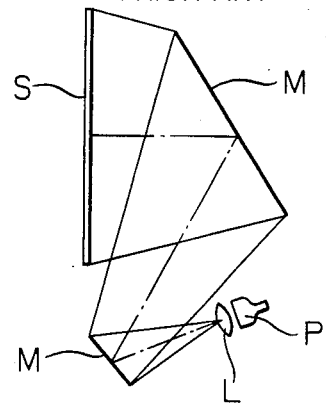
Figure 2C:
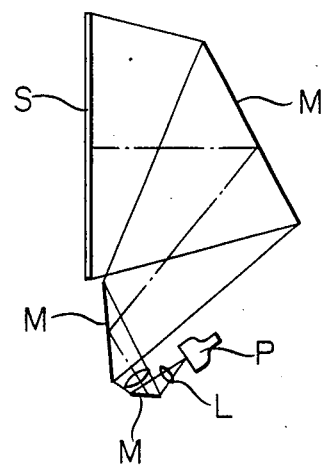
Figure 3:
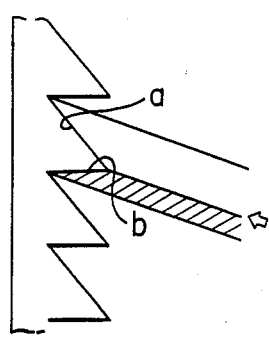
FIG. 3 is a partially cutaway side elevational view of a Fresnel lens used in a conventional rear projection screen.
Figure 4:
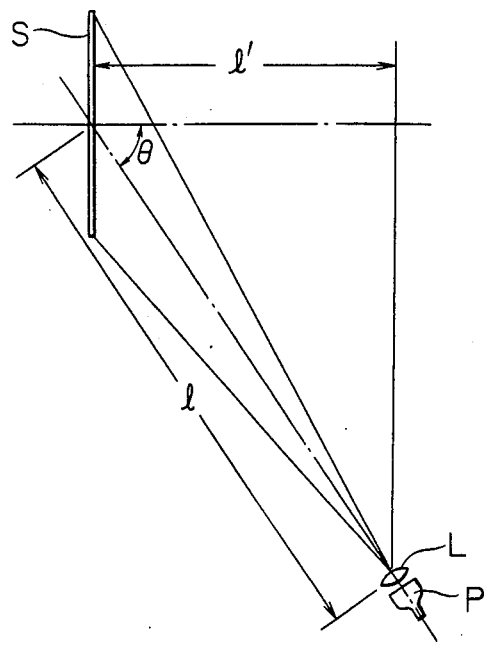
FIGS. 4, 5A, and 5B are schematic side elevational views explaining a passage of light introduced from a projector to a rear projection type screen according to the present invention.

FIG. 4 is a schematic drawing explaining the basic arrangement of a rear projection type screen according to the present invention, in which reference character P denotes a light source, such as a CRT; L, a lens system; and S, a rear projection screen. Light introduced from the light source P is adapted to be made incident upon the rear surface of the rear projection screen S at a sharp angle. The angle $\theta$ of incidence upon the rear projection screen S is generally dependent upon the distance of light projection, but preferably is in a range from 40 to 85. This distance l from the light source P to the rear projection screen S is the same as that adopted in a conventional method, but, since the light source P is located diagonally downward, a distance l' in the direction of the depth is:

$$l' = l \cos \theta.$$

so that l' can be made relatively small in comparison with l.

Figures 5A, 5B:
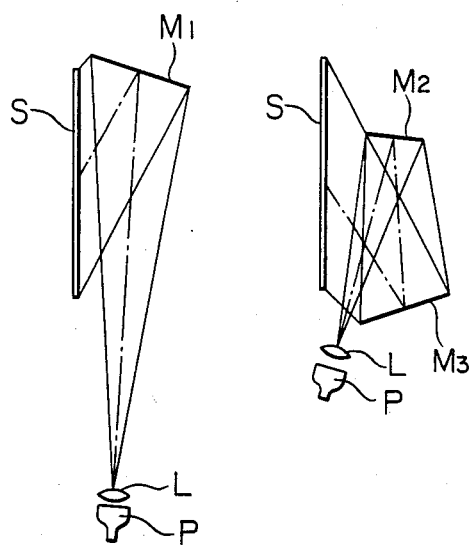

However, since the height of the projection set may not be always made sufficiently low, it is desirable in practice to reduce the height by employing a mirror $M_1$, as shown in FIG. 5A, and to reduce the length in the direction of the depth as well. In addition, in order to further reduce the height so as to make the overall dimensions smaller, two mirrors $M_2$ and $M_3$ may be combined, and the light source P may be interposed between the rear projection screen S and the first mirror $M_2$ so as to project the light after being reflected twice.

Figure 6:
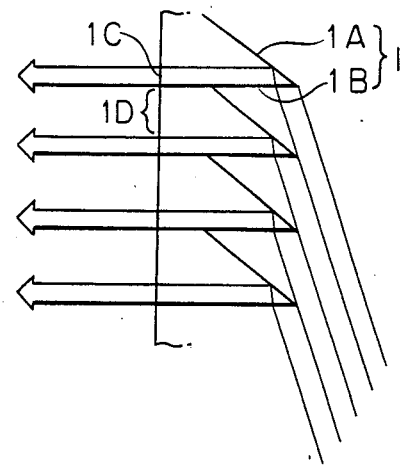
FIG. 6 is a partial cross-sectional view explaining the state of light introduced to the rear projection type screen according to the present invention.

FIG. 6 illustrates a portion of the rear projection screen of the present invention, and, in this embodiment, a plurality of prisms having the same configuration are provided on the rear surface of the rear projection screen. In other words, these prisms are constituted by a plurality of prisms 1 extending along concentric circular arcs in parallel and each prism 1 having a light incidence surface 1B and a light reflection surface 1A. A total reflection surface is formed on the light reflection surface 1A in such a manner that the light entering from the light incidence surface 1B is totally reflected and is then emerged from a front viewing surface.

Description of the optical characteristics of this prism 1 will be made with reference to FIGS. 6 to 8. Circular arc-shaped prisms 1 are formed on the rear surface of the rear projection screen S of the embodiment of the present invention in such a manner as to be disposed concentrically. Incidentally, since the light is projected diagonally from the rear in this embodiment, each prism 1 has an upwardly convex circular arc-shape, but, if the light is projected diagonally from above, the convex portion of the prism faces the opposite direction.

In this case, assuming that the light source for projection, e.g. a CRT, is P and that 0 is the center of the screen, the center of the circular arc in a plane F including the screen S is O', and if a segment O'P is made perpendicular to the plane F, each point on the same arc becomes equidistant from the light source P. Consequently, by making the cross sections of the prism 1 along this circular arc identical, the angles of emergence from the cross sections of the prism become equal, with the result that design becomes easy and, furthermore, it is possible to realize a well-balanced screen S which is capable of controlling the light not only in the vertical direction but also in the horizontal direction.

Figure 7:
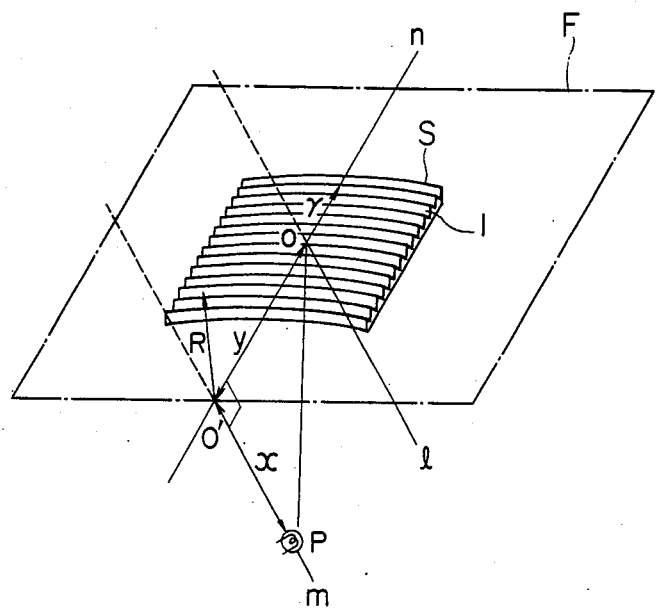
FIGS. 7 and 8 are a perspective view and a partial cross-sectional view, each explaining the design of the configuration of the screen according to the present invention.
Figure 8:
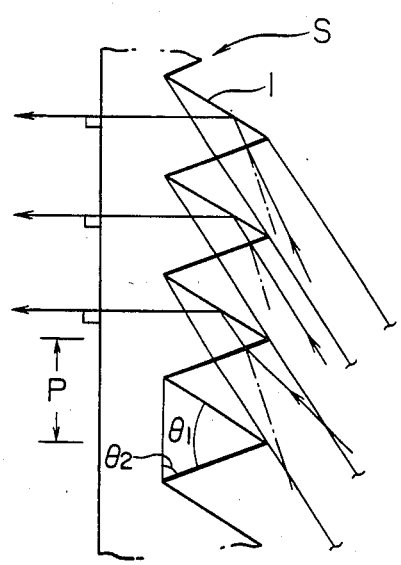

Assuming now that the distance between the light source P and the center O' of the arcs is x and the distance between the center O of the screen S and the center O' of the arcs is y, as shown in FIG. 7, the open angle of the prism at a point having distance Y (upwardly positive) from the center of the vertical axis passing through the center O of the screen S is $\theta_1$, and the inclination of the light incidence surface of the prism is $\nu_2$, then $\theta_2$ in the case of parallel emergence can be obtained by the following Formula 1 (where n is an index of refraction):

$$\tan\theta_2 = \frac{\frac{(y + y)}{\sqrt{x^2 + (y + y)^2}} + n\sin2\theta_1}{\frac{x}{\sqrt{x^2 + (y + y)^2}} - n\cos2\theta_1} \tag{1}$$

If the cross-sectional configuration of the prism 1 is made into one expressed by the above Formula (1), all the rays of light emerging from the surface of the screen S become parallel rays of light which are normal to the screen S. Hence, it becomes possible to obtain a screen which is more compact and displays a more uniform brightness as compared with a screen having a conventional Fresnel lens.

Figure 9:
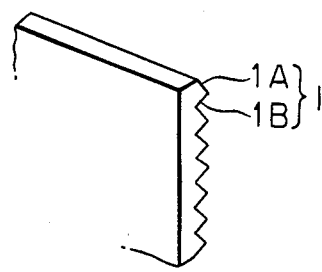
Figure 10:
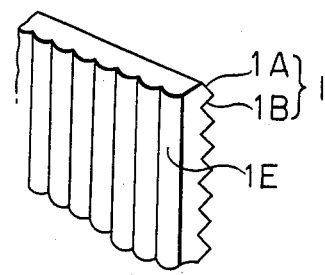
Figure 11:
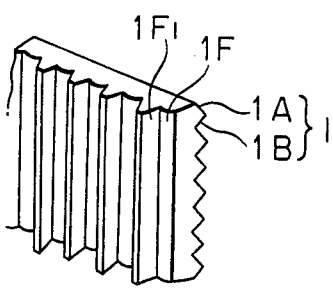
Figure 12:
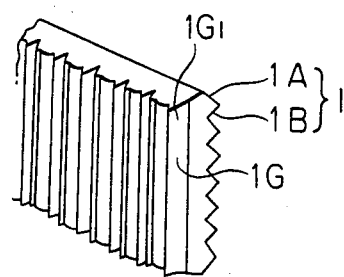

FIGS. 9 to 14 show various embodiments, in part, of the present invention. FIG. 9 shows a most basic rear projection screen, in which are formed a plurality of prisms 1 each having a light incidence surface 1B and a light reflection surface 1A which is in at least one part provided with a total reflection surface, which is a characteristic feature of the present invention. FIG. 10 shows a rear projection screen in which a lenticular lens surface 1E extending vertically is formed on the viewing side in the embodiment shown in FIG. 9, and this lenticular lens surface 1E imparts the horizontally diffusing characteristics of the light. In addition, FIGS. 11 and 12 show rear projection screens in which lenticular lens surfaces 1F, 1G each having total reflection surfaces 1F₁, 1G₁ are similarly formed on the viewing side thereof, respectively, thereby making it possible to obtain even greater horizontal diffusing characteristics of light, i.e, a greater field of vision. Further, such total reflection surfaces formed in the lenticular lens surface allow the light rays totally reflected thereon to emerge from the screen over a wide viewing angle, and therefore to cross each other so that it is possible to enhance the mixing of colors in the case of color television sets. Since the arrangements and operation of lenticular lens surfaces 1F, 1G having total reflection surfaces shown in FIGS. 11 and 12 are described in detail in Japanese Patent Application Nos. 51194/1981 90544/1982 (corresponding to U.S. Pat. No. 4,418,986), 91896/1981, 212584/1981 (corresponding to U.S. Pat. No. 4,469,402), 29178/1981 (corresponding to U.S. Pat. No. 4,468,092), and 59389/1982 filed by the applicants, description of them will be omitted herein.

Figure 13:
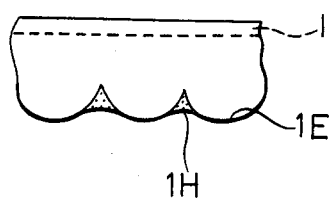
Figure 14:
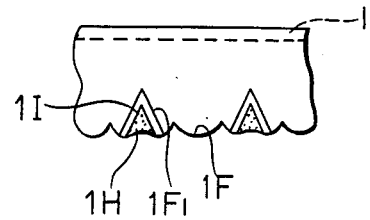

If a lenticular lens surface is formed on the viewing side, as shown in the embodiments of FIGS. 10 to 12, a portion which does not transmit light is formed on the lens surface, an external light absorbing layer 1H may be formed by making use of this light nontransmissive portion, as shown in FIG. 13. In addition, if a lenticular lens surface having a total reflection surface is formed, as shown in FIGS. 11 and 12, it is possible to ensure that the light does not substantially emerge from this total reflection surface, so that an external light absorbing layer can be provided to this total reflection surface. In this case, the external light absorbing layer 1H may be provided via a reflection layer 1I made of a material having a smaller index of refraction than that of a substrate, as shown in FIG. 14, so that the function of the total reflection surface will not be deteriorated.

FIGS. 15 and 16 show embodiments of the present invention in which a separate lens sheet 2 is combined with the rear projection screen shown in FIG. 9, on the viewing side thereof. In the embodiment of FIG. 15, the rear projection screen is combined with such a separate sheet 2 having a lenticular lens surface 2A extending horizontally on the projection side thereof and a vertical lenticular lens surface 2B having a total reflection surface $2B_1$ similar to that of FIG. 12. This arrangement makes it possible to obtain a rear projection screen which has both horizontally and vertically diffusing characteristics of light. FIG. 16 shows another rear projection screen with which are combined a separate lens sheet having a lenticular lens surface 2C extending vertically on the projection side and a concave lenticular lens surface 2D together with external light absorbing layers 2E. This arrangement makes it possible to increase the contrast and the horizontally diffusing characteristics of light.

In the aforementioned embodiments, prisms 1 are disposed continuously such as to extend in a substantially horizontal direction, but the prisms 1 can also be arranged such as to extend in the substantially vertical direction. It goes without saying that the projector should be disposed in the transverse direction in this case.

With the rear projection screen according to the present invention, since an image is projected diagonally from the rear, a distortion may occur in the image and the fading of the image will occur. However, these problems can be overcome by taking the following measure in the projection system. In other words, the distortion of an image may be corrected by the electrical circuit of a CRT by taking in account of an amount of distortion for each portion. Meanwhile, since the fading of an image results owing to a difference in the distance between the lens system and the screen, an image introduced from the CRT to the lens system may be given a predetermined angle with respect to the optical axis in such a manner as to form an equal focal length on the screen.

As to a material used for the rear projection screen of the present invention, acrylic resin is most suitable. The reason is that acrylic resin is particularly superior in terms of optical characteristics, and fabrication efficiency while having a suitable rigidity. However, instead of acrylic resin, it is also possible to use polyvinyl chloride resin, polycarbonate resin, olefin resin, and styrene resin. When these synthetic resin materials are used, it is possible to fabricate a rear projection screen pertaining to the present invention by means of extrusion molding, heating press, or injection molding.

Furthermore, a light diffusing means for further enhancing the light diffusing characteristics may be added in the base material constituting the rear projection screen of the present invention or the separate sheet. As for this light diffusing means, one or two or more kinds of additives of diffusing materials which are not dissolved in or undergo chemical change by a liquid synthetic resin syrup and molten medium, including $SiO_2$, $CaCO_3$, $Al_2O_3$, $TiO_3$, $BaSO_4$, $ZnO$, $Al(OH)_3$, fine glass powders, and an organic diffusing agent, may be mixed and distributed in the medium such as to be dispersed uniformly in a synthetic resin constituting the substrate, e.g., acrylic resin, or a layer including such diffusing materials may be provided to the screen. Furthermore, it is also effective to form a fine matter surface on the projection-side screen surface and/or the viewing-side screen surface. If such a means for imparting light diffusing characteristics is adopted, the diffusion of light in the horizontal and vertical directions of the screen can be compensated, thereby enabling enhancement of the uniformity of the diffusion of light.

EXAMPLE 1

A rear projection screen having circular arc-shaped prisms was fabricated from a transparent acrylic resin sheet (3 mm thick) with a refractive index of 1.49 by means of hot press molding.

The specifications of the prism and the positional relationship of a light source installed in this Example were as follows (refer to FIG. 7):

Position of the light source:
  x rearward of the screen = 600 mm
  y downward of the center of the screen = 1,000 mm
  (Light is made incident upon the center of the screen at 60° with respect to the plane of the screen.)
Open angle of the prism: $\theta_1 = 50°$
Center of the circular arc of the prism:
  1,000 mm downward on the vertical axis from the center of the screen
Pitch of the prism: P = 0.5 mm
Size of the screen: 700 mm (height) x 900 mm (width)

The angle $\theta_2$ of inclination of each prism was set to the angle calculated from Formula (1). For example, the angle $\theta_2$ was 72° at the center of the screen. Under this condition, all the rays of light emerge from the plane of the screen in parallel with each other, perpendicular to the plane of the screen.

In the above-described arrangement, light entering the center of the screen at an angle of 60° was reflected totally by the reflective surfaces of the prisms and was then emerged from the viewing surface with a high degree of efficiency. When the brightness was measured in the procedure described for FIG. 16, the light utilization rate at the center and upper portion of the screen was 100%, and even at the lower end portion thereof was 90%. Thus, it was possible to confirm that the rear projection screen having the aforementioned arrangement exhibits a high light utilization rate and a sufficient and uniform control of the light in the horizontal direction, and makes it possible to reduce the depth of projection to a very small dimension.

EXAMPLE 2

A rear projection screen was fabricated from a 3 mm-thick acrylic resin plate mixed with $SiO_2$ as a diffusing agent by means of hot pressing.

The prisms on the light source side in this Example were the same those in Reference Example 1, but a lenticular lens surface with a total reflection surface, a lens unit of which is shown in FIG. 16, was employed on the viewing surface. The dimensions of various parts of this lens unit were as follows:
  $\theta_3$: 72.5°
  $r_1$: 0.5 mm
  $P_1$: 1.2 mm $P_2$: 0.72 mm The screen thus obtained (size: 840×635 mm) was measured with respect to five positions as in the case of Reference Example 1, and the results shown in FIG. 19A were obtained. Except for a case where prism pieces were arrayed in parallel in a rectilinear manner, for comparison's sake, the same screen as that of Example 2 was fabricated, and when measurement was made similarly, the results shown in FIG. 19B were obtained. The numerical values in the Figures show screen gains, respectively, and it was found that the screen of the present invention excels in the uniformity of brightness having four corners with a not so extremely low brightness. The term "screen gain" means a gain of light transmitted through a screen, and can be expressed by the following formula:

$$\text{Gain} = \frac{\text{foot Lambert (ft-L)}}{\text{foot Candela (ft-Cd)}}$$

EXAMPLE 3

An external light absorbing layer similar to the one shown in FIG. 14 was formed on the lenticular lens of the screen obtained in Reference Example 2. At this juncture, a fluorine-containing polymer having a lower refractive index than acrylic resin was provided on the total reflection surface as a reflection layer, and an external light absorbing layer was formed on it using black ink.

Figure 20:
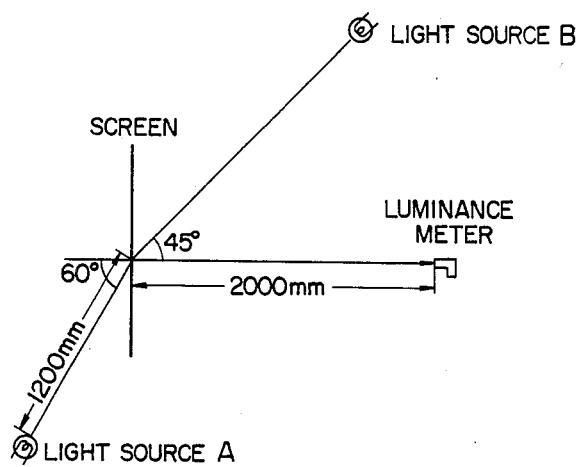
FIG. 20 is a diagram explaining a method of measuring the brightness of a screen in the form of a second example of the invention.

A comparison was made between the thus obtained screen and a screen having no external light absorbing layer, similar to the one used in the Example 2 with the use of a measuring apparatus as shown in FIG. 20., concerning their contrasts, and the results of the measurements are shown in Table 1.

In order to effectively use the measuring apparatus shown in FIG. 20, the following estimation was made:

(1) the brightness of white color was defined such that the light source B emitting light which simulates the external light was turned off while the light source A was turned on, and under this condition the brightness on the screen was set to 100 cd/m$^2$; and (2) the brightness of black color was defined such that the intensity of light was decreased to set the brightness on the screen to 1 cd/m$^2$ under the above-mentioned condition.

The brightness of white and black colors were measured for both screens, respectively to obtain the contrast thereof.

As understood from Table 1, the screen having external light absorbing layers exhibited an excellent contrast characteristic.

Then, the light source B was turned on so as to set the intensity of light therefrom to 500 lx. and thereafter the light source A was turned on. Under this condition, the brightness of the white and black colors was measured to obtain the contrast of the screen.

The present invention having the aforementioned arrangements has advantages in that, since light introduced onto the rear surface of the screen at a sharp angle can be emerged uniformly from the viewing surface with high efficiency by virtue of the configuration of the prisms and the action of the internal reflection, it becomes possible to locate the relative position of a projector serving as a light source obliquely rearward when the rear projection screen of the present invention is used, thereby making it possible to make the entire projector compact, and that a rear projection screen exhibiting a uniform brightness can be provided easily.

What is claimed is:

1. A rear projection screen having a rear surface for receiving light from a light source at a sharp angle, a light transmitting medium through which said light from said rear surface is transmitted and a front viewing surface from which said light transmitted from said rear surface through said light transmitting medium is emerged, said rear surface being provided with a plurality of elongated prisms extending along curved lines, said prism having an internal reflection surface, said internal reflection surface reflecting internally said light received by said rear surface so that said light is transmitted through said light transmitting medium and then emerges from said front viewing surface.

2. A rear projection screen having a rear surface for receiving a light from a light source at a sharp angle, a light transmitting medium through which said light from said rear surface is transmitted and a front viewing surface from which said light transmitted from said rear surface emerges, said rear surface being provided with a plurality of elongated circular prisms extending substantially along circular lines which are parallel with each other, each said prism having a reflection surface, said reflection surface reflecting internally said light received by said rear surface so that said light is transmitted through said light transmitting medium and then emerges.

3. A rear projection screen as set forth in claim 2 wherein said circular lines are concentric, having substantially the same center point on a plane on which said rear surface extends, and said reflection surface is a total reflection surface extending in the longitudinal direction of each prism, for totally and internally reflecting said light received by said rear surface.

4. A rear projection screen as set forth in claim 3, wherein, assuming that said light source is P and the center of said circular lines including said screen is O', a segment O'P is perpendicular to the plane including said screen.

5. A rear projection screen as set forth in claim 3 or 4, wherein all the rays of light emerging from said front viewing surface are parallel rays of light that are perpendicular to the screen surface.

6. A rear projection screen as set forth in claim 2, wherein a lenticular lens surface extending vertically in said front viewing surface is provided.

TABLE 1

| SAMPLE OF SCREEN | NO EXTERNAL LIGHT | | EXTERNAL LIGHT 500lx | | CONTRAST |
|---|---|---|---|---|---|
| | WHITE | BLACK | WHITE (W) | BLACK (B) | W/B |
| HAVING EXTERNAL LIGHT ABSORBING LAYER | 100 cd/m$^2$ | 1 cd/m$^2$ | 113 cd/m$^2$ | 15 cd/m$^2$ | 7.5 |
| HAVING NO EXTERNAL LIGHT ABSORBING LAYER | 100 | 1 | 125 | 28 | 4.5 |

7. A rear projection screen as set forth in claim 6, wherein a lenticular lens surface having a total reflection surface is formed.

8. A rear projection screen as set forth in claim 7, wherein external light absorbing layers are formed on the light nontransmissive portions of said lenticular lens.

9. A rear projection screen as set forth in claim 7, wherein an external light absorbing layer is formed on said each total reflection surface via a light reflecting layer.

10. A rear projection screen as set forth in claim 2, wherein a circular Fresnel lens is formed on said front viewing surface.

11. A rear projection screen as set forth in claim 2, wherein a light diffusing means is provided to said light transmitting medium of said screen.

12. A rear projection screen as set forth in claim 2, wherein a separate sheet having a lenticular lens surface with a light nontransmissive portion is combined with said screen.

13. A rear projection screen as set forth in claim 12, wherein an external light absorbing layer is formed in said light nontransmissive portion of said lenticular lens of said separate sheet.

14. A rear projection screen as set forth in claim 1, wherein a circular Fresnel lens is formed on said front viewing surface.

15. A rear projection screen as set forth in claim 1, wherein a light diffusing means is provided to said light transmitting medium of said screen.

16. A rear projection screen as set forth in claim 1, wherein a separate sheet having a lenticular lens surface is combined with said screen.

17. A rear projection screen as set forth in claim 16, wherein a lenticular lens surface having a total reflection surface is formed.

18. A rear projection screen as set forth in claim 17, wherein external light absorbing layers are formed on the light nontransmissive portions of said lenticular lens.

19. A rear projection screen as set forth in claim 17, wherein an external light absorbing layer is formed on each said total reflection surface by a light reflecting layer.

* * * * *